Aug. 1, 1950     C. F. PATTERSON     2,517,411
FASTENER FOR REFRIGERANT EVAPORATOR
Filed July 8, 1946
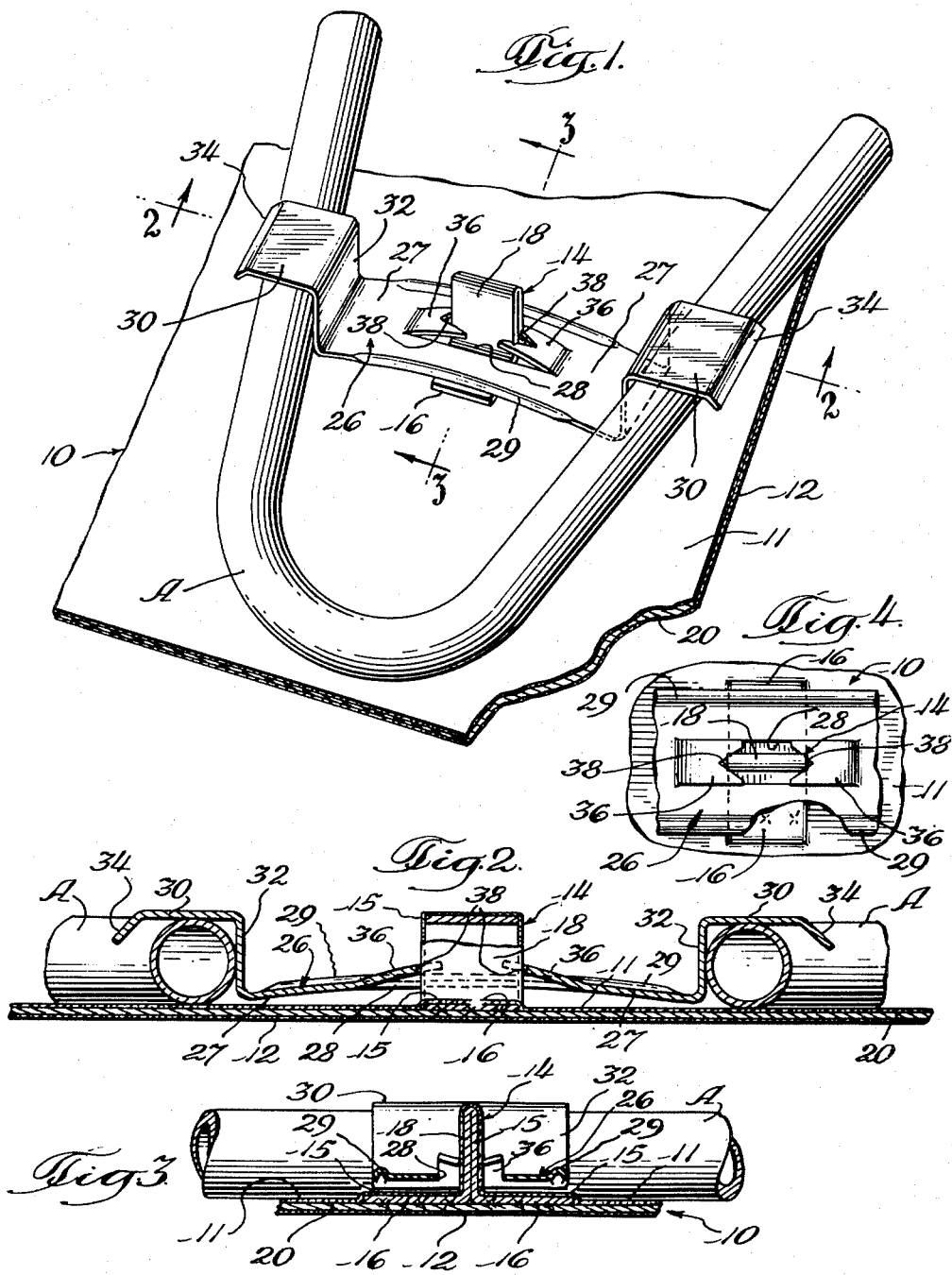
Inventor
Charles F. Patterson
By Hinkle, Horton, Ahlberg, Hausmann & Kipper
attorneys Patented Aug. 1, 1950

2,517,411

UNITED STATES PATENT OFFICE 2,517,411

FASTENER FOR REFRIGERANT EVAPORATOR

Charles F. Patterson, Wilmette, Ill., assignor to Admiral Corporation, Chicago, Ill., a corporation of Delaware Application July 8, 1946, Serial No. 682,082

7 Claims. (Cl. 62—126)

This invention relates to a fastening device adapted to secure a rod, or a tube, or some other part or member in position against a surface.

The principal object of the invention is to provide a new and improved fastener for securing a member against the surface, and adapted to be rapidly applied and adjusted to holding position without the use of tools.

The invention has been developed particularly for use in mounting an element against an enameled metallic surface, such as that of a liner which forms a wall of a food compartment in a refrigerator, and in this connection, it is an object of the invention to provide a fastener by which a member can be secured to the enameled liner without cutting into said liner or otherwise doing work upon it which would chip or damage the enamel.

More specifically therefore, it is an object of the invention to provide a fastener for securing a tube or like member against a surface, and which includes a stem element welded or otherwise rigidly secured to an enameled metallic wall, said stem element having an enameled coating continuous with that of the wall, and a resilient holding element having an opening and a spring tang by which the stem is frictionally held in the opening when the holding element is pressed on to the stem with the said tube engaged between the holding element and the enameled surface.

Other objects and advantages of the invention will appear from the following description taken in connection with the drawing, in which:

Figure 1 is a perspective view showing a fragment of an enameled metallic wall and a fragment of tubing secured thereto by a fastener embodying this invention;

Fig. 2 is a sectional view taken transversely of the axis of the tubing and cutting through the enameled wall substantially as indicated at line 2—2 of Fig. 1;

Fig. 3 is a section taken substantially at line 3—3 of Fig. 1; and

Fig. 4 is a fragmentary face view of the fastener.

In the copending application of Evans T. Morton, Serial No. 720,080, filed January 3, 1947, for an invention entitled "Refrigerator," a fastener embodying the present invention is shown as the means by which the tubing, which constitutes the evaporator coil of the refrigerator, is secured in heat transfer relation to a liner which forms a food storage compartment. The drawings of the present applicatiton may be considered as showing portions of the same structure in which a fragment of the enameled sheet metal liner is seen at 10, and a fragment of the tubing forming the evaporator coil is seen at A lying flatly against the outer surface 11 of the liner 10. The tubing A is thus accommodated in the insulating space between the outer surface 11 of the liner 10 and the outside wall or casing of the refrigerator. This outer surface 11 of the liner is preferably finished with a ground coating of porcelain enamel which is baked onto the sheet metal of the liner, and the inner surface 12, which defines the food storage compartment is finished with a baked white porcelain enamel coating.

It is therefore impracticable to drill or otherwise perforate the liner after it is enameled in order to provide for bolts or other headed fastening elements for securing the tubing in place, because the drilling or perforating operation would crack and chip the enamel, thus destroying its value as a preservative of the metallic body of the liner and also ruining the appearance of the white porcelain enameled surface 12 of the food compartment. Even if the sheet metal were first drilled or punched and then enameled, the clamping pressure of headed bolts or fasteners extending through the liner would cause cracking or crazing of the inner surface 12; and, in any event, the heads of such fastening means would detach from the desired smooth and sanitary appearance of the interior wall of the food compartment. It is also impossible to weld or braze any fastening members onto the outer surface 11 after the enamel coating has been applied thereto without destroying the enamel.

Accordingly the present invention provides stem elements or posts which are secured to the sheet metal base 20 of the liner 10 before its enamel coatings are applied and the enamel coating 11 then extends continuously over the outer surfaces of the liner and the exposed surfaces of the projecting stems or posts. A preferred form of projection 14 for this purpose is made of a strip of sheet metal doubled upon itself as shown in Fig. 3, with its end portions 16, 16 bent to extend in opposite directions and in a common plane. This forms a T-shaped element comprising a stem 18 of double thickness and a head composed of the aligned portions 16, 16. This head is welded flatly to the surface of the sheet metal base 20 of the liner 10 as indicated in Fig. 2, with the stem portion 18 projecting at right angles from the surface. The enamel coating 12 is then applied to the inner surface and the enamel coating 11 is applied to the outer surface of the base 20 and is continued at 15 to cover the stem portion 18 and the outer surfaces of the parts 16, 16.

To cooperate with each of the stem elements or posts 14, I provide a holding clip 26 in the form of a strip of resilient sheet material having an opening at 28 dimensioned to receive the stem 14, and having end portions or stirrups 30, 30 which may be formed as desired and in view of the parts or elements which are to be held in place by them. As shown, each end portion or stirrup includes a part 32 bent outwardly from the main or middle portion of the clip 26 and to support the part 30 in offset relation. The extreme ends 34 are bent back toward the surface of the liner 10 so that in effect each end portion of the clip 26 more or less embraces the outer surface of the tubing A sufficiently to prevent the tubing from sliding over the surface of the liner, the portions 32 serving as shoulders against which the sides of the tubing may lodge and the parts 34 providing retaining shoulders. In the particular arrangement shown, the tubing is formed with a bend from which its adjacent portions extend divergently; if these parts were strictly parallel, the end portions 30 of the member 26 might be curved to fit snugly around them, but n view of their divergent relation, the distance between the part 32 and the part 34 at each end of the clip 26 is sufficient to accommodate the tubing 12 in the oblique position shown.

In the vicinity of the opening 28, the resilient clip 26 is slit to form two tangs 36, 36 disposed at opposite sides of the opening so that the ends of these tangs in fact partially define the opening through which the stem 14 protrudes. The insertion of the stem 14 in the opening 28 springs the tangs 36, 36 away from the plane of the adjacent surface of the metal and in a direction away from the surface of the liner 10 as seen clearly in Figs. 1 and 2. As the clip 26 is pressed toward the liner 10, the ends of the tangs 36 are thus wedged into engagement with opposite sides of the stem 14, which, in the arrangement shown, are the doubled edges of the flat stem of the T-shaped element. The tangs 36 are thus braced against these edges of the stem 14 to oppose the removal of the clip 26 or withdrawal of the stem 14 from the opening. The frictional engagement of the ends of the tangs 36 with the stem 14 is increased by forming these ends with angular or V-shaped notches 38 into which the edges of the stem 14 are wedged when the clip 26 is pressed toward the surface of the liner 10.

The portions 27 of the holding member 26 between its opening 28 and the end portions 30 are thus resiliently flexed as the clip is applied to the stem 14 with the tubing 12 engaged under its edge portions 30, 30 and these end portions are thus pressed firmly against the tubing so as to hold the tubing in effective heat transfer relation to the surface of the liner 10. Since this mounting of the tubing on the liner is intended to be substantially permanent, it is unobjectionable if the edges of the notches 38 actually cut into the enameled edges of projecting stem 14 when the fastener has been finally positioned. The resilient character of the clip 26 may be relied upon to hold the tubing firmly in engagement with the surface of the liner even though the structure may be subject to some vibration during operation of the refrigerator mechanism. Preferably, to reinforce the clip 26 against excessive flexibility by reason of the opening 28 therein and to control the amount of flexibility it possesses, the lateral margins of the member are formed with stiffening beads at 29, as seen in Figs. 1 and 3.

It will be understood that when the desired position or arrangement of the tubing A has been determined and the stem elements 14 have been suitably located and secured to the metallic wall 10 and covered with the enamel coating 15, the assembly of the evaporator coil on the liner can be very rapidly accomplished since its securement involves merely pressing into position the several fastening elements 26 which hold the coil in place, and this can be done manually without the use of any special tools or special skill.

The shape and resiliency of the clip 26 are determining factors in limiting strain on the porcelain enamel at any particular point. It is a well known fact that porcelain enamel can withstand only a certain amount of strain before it starts chipping or crazing. With customary methods of applying evaporator tubing the amount of strain placed upon the liner is governed by the operator. A highly skilled man could produce a satisfactory workmanlike job, but highly skilled men are not always readily employable. By using the clip 26 of the present invention provided with the tube engaging surface 30 connected by a resilient body portion, the strain that is applied to the porcelain enamel can be limited regardless of whether or not the clip is pushed all the way onto the stem. In fact, the clip described in this specification is arranged so that maximum pressure can be used to apply it to the stem without in any way damaging the enamel finish. This result is obtained by the fact that the clip itself is the determining factor in limiting the strain upon the liner but yet firmly holding the evaporator tubing against the surface of the liner.

While there is shown and described herein certain structure embodying and illustrating the invention, it will be understood that the invention is not limited thereto or thereby but includes all modifications, variations and equivalents of its several parts which may come within the scope of the appended claims. What is claimed as new and desired to be secured by United States Letters Patent is:

1. In a refrigerator which includes an enameled liner and an evaporator coil disposed in contact therewith, means for holding the tubing of said coil in position on said liner comprising, in combination, a stem projecting from the surface of the liner and having a coating of enamel continuous with that of the liner, and a resilient clip having an opening through it dimensioned to receive said stem, said clip having a tang adjacent to the opening in position to be flexed by the entry of said stem, with the end of the tang engaging said stem, and said clip having a portion at a distance from said opening bearing against the outer surface of the tubing, the pressure exerted by said clip being set so as firmly to hold the tubing against the liner without damage to the enameled surface thereof.

2. In a refrigerator which includes an enameled liner and an evaporator coil disposed in contact therewith, means for holding the tubing of said coil in position on said liner comprising, in combination, a stem projecting from the surface of the liner and having a coating of enamel continuous with that of the liner, and a resilient clip having an opening through it dimensioned to receive said stem, said clip having a tang adjacent to the opening in position to be flexed by the entry of said stem, the end of the tang having an angular notch between the edges of which said enameled stem is wedged, the engagement of the tang with said stem opposing withdrawal of the stem from the opening, and said clip having a portion at a distance from said opening formed to engage the outer surface of the tubing so as firmly to hold the tubing against the liner without harm to the enameled surface thereof.

3. In the combination defined in claim 1, said stem comprising a strip of sheet metal folded in T-form, the cross member of said T-form being secured flatly to the outer surface of the liner with the stem portion projecting therefrom and with the enamel coating covering the stem and cross member of said T-form.

4. In a refrigerator which includes a food compartment liner and an evaporator coil disposed in contact with the outer surface of the liner, said liner having a coating of enamel on its inner surface, means for holding the tubing of said coil in position on said liner comprising, in combination, a stem having a head secured flatly to the outer side of the liner with said stem projecting therefrom, and a resilient sheet metal clip having an opening dimensioned to receive said stem, said clip having a tang adjacent to the opening in position to be flexed by the entry of said stem, with the end of the tang engaging said stem, and said clip having a portion at a distance from said opening bearing against the outer surface of the tubing so as firmly to hold the tubing against the outer surface of the liner but with insufficient force to flex the liner and thereby damage the enamel coating on the inner surface thereof.

5. In the combination defined in claim 1, the end of said tang having a notch with outwardly divergent edges which engage said stem.

6. In a refrigerator which includes an enameled liner and an evaporator coil disposed in contact therewith, means for holding the tubing of said coil in position on said liner comprising, in combination, a stem projecting from the surface of the liner and having a coating of enamel continuous with that of the liner, and a resilient sheet metal clip having an opening through it dimensioned to receive said stem, said clip having a tang adjacent to the opening in position to be flexed by the entry of said stem and to engage said stem thereby to oppose removal of said clip therefrom, said clip having a stirrup shaped portion at a distance from said opening formed to engage the outer surface of the tubing, and said clip having a resilient arm extending between that part of said clip adjacent said opening and said stirrup shaped portion, whereby said clip firmly holds the tubing against the liner but with insufficient force to damage the enamel surface thereof.

7. A fastener for securing a member against a surface comprising a stem element projecting from the surface, said stem element comprising a strip of sheet metal doubled upon itself with its end portions bent to extend in opposite directions forming a T-shaped structure, said end portions being affixed to the surface with the doubled stem portion projecting therefrom, and a clip formed from a resilient sheet material, said clip having an opening dimensioned to receive said stem when the clip is applied thereto, the material being slit adjacent to the opening forming a pair of tangs having their free ends facing and spaced apart by less than the width of said stem, said tangs being adapted to be sprung out of the plane of the adjacent material with their free ends engaging said stem in angular relation thereto, the opposite ends of said tangs having deeply cut angular notches with divergent edges between which the doubled edges of said stem are adapted to be wedged to oppose withdrawal of said clip from said stem when said clip is applied thereto, and a portion of the clip at a distance from said opening being biased toward the surface when said clip is applied to said stem, thereby to secure a member engageable thereunder against the surface.

CHARLES F. PATTERSON.

REFERENCES CITED

The following references are of record in the file of this patent:

UNITED STATES PATENTS

| Number | Name | Date |
| --- | --- | --- |
| Re. 22,659 | Tinnerman | Aug. 7, 1945 |
| 1,690,853 | Behrman | Nov. 6, 1928 |
| 1,828,776 | King | Oct. 27, 1931 |
| 1,847,546 | Wishart | Mar. 1, 1932 |
| 1,882,306 | Tinnerman | Oct. 11, 1932 |
| 1,987,422 | Steenstrup | Jan. 8, 1935 |
| 2,173,544 | Tinnerman | Sept. 9, 1939 |
| 2,225,394 | Tinnerman | Dec. 17, 1940 |
| 2,276,811 | Ward | Mar. 17, 1942 |
| 2,366,942 | Tinnerman | Jan. 9, 1945 |
| 2,467,191 | Crider | Apr. 12, 1949 |

Certificate of Correction

Patent No. 2,517,411 August 1, 1950

CHARLES F. PATTERSON

It is hereby certified that error appears in the printed specification of the above numbered patent requiring correction as follows:

Column 2, line 30, for the word "detach" read *detract*; column 3, line 27, for "n view" read *in view*;

and that the said Letters Patent should be read as corrected above, so that the same may conform to the record of the case in the Patent Office.

Signed and sealed this 31st day of October, A. D. 1950.

[SEAL]

THOMAS F. MURPHY,
*Assistant Commissioner of Patents.*